United States Patent
Katano

(10) Patent No.: US 10,414,351 B2
(45) Date of Patent: Sep. 17, 2019

(54) ELECTRIC INTERCONNECT STRUCTURE FOR FUEL CELL VEHICLES

(71) Applicant: TOYOTA JIDOSHA KABUSHIKI KAISHA, Toyota-shi, Aichi-ken (JP)

(72) Inventor: Koji Katano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 344 days.

(21) Appl. No.: 15/480,445

(22) Filed: Apr. 6, 2017

(65) Prior Publication Data

US 2017/0297513 A1 Oct. 19, 2017

(30) Foreign Application Priority Data

Apr. 15, 2016 (JP) .................. 2016-081717

(51) Int. Cl.
| | | |
|---|---|---|
| *B60L 1/00* | (2006.01) | |
| *B60L 3/00* | (2019.01) | |
| *H02G 3/00* | (2006.01) | |
| *B60R 16/02* | (2006.01) | |
| *H02M 3/04* | (2006.01) | |

(Continued)

(52) U.S. Cl.
CPC .......... *B60R 16/0207* (2013.01); *B60L 50/51* (2019.02); *B60L 50/66* (2019.02); *B60L 50/71* (2019.02); *H02M 3/04* (2013.01); *B60L 2210/10* (2013.01); *H02J 1/10* (2013.01); *H02J 2001/004* (2013.01); *H02P 27/06* (2013.01); *Y02T 10/705* (2013.01); *Y02T 10/7216* (2013.01); *Y02T 90/34* (2013.01)

(58) Field of Classification Search
CPC .......... B60L 50/51; B60L 50/66; B60L 50/71; B60L 2210/10; B60R 16/0207; H02M 3/04; H02J 1/10; H02J 2001/004; H02P 27/06; Y02T 10/705; Y02T 10/7216; Y02T 90/34
USPC ...................................................... 307/10.1
See application file for complete search history.

(56) References Cited

U.S. PATENT DOCUMENTS 6,883,628 B1 4/2005 Mizukami et al.
9,199,550 B2 * 12/2015 Katano ................... B60L 50/72
(Continued)

FOREIGN PATENT DOCUMENTS

| JP | 8-258643 | 10/1996 |
| JP | 8-332905 | 12/1996 |

(Continued)

*Primary Examiner* — Rexford N Barnie
*Assistant Examiner* — Toan T Vu
(74) *Attorney, Agent, or Firm* — Finnegan, Henderson, Farabow, Garrett & Dunner, LLP

(57) ABSTRACT

A fuel cell vehicle has both left-hand drive specifications and right-hand drive specifications. A first converter is placed at a same position whichever of the left-hand drive specifications or the right-hand drive specifications are applied. A second converter is placed on a selected one of the left-hand side and the right-hand side of the center line of the fuel cell vehicle for the left-hand drive specifications, while, for the right-hand drive specifications, placed on the other side of the center line of the fuel cell vehicle opposite to the selected one side for the left-hand drive specifications. A first wire harness to be used as the wire harness for the left-hand drive specifications and a second wire harness to be used as the wire harness for the right-hand drive specifications are equal in length to each other.

4 Claims, 6 Drawing Sheets

(51) Int. Cl.
    *B60L 50/51*     (2019.01)
    *B60L 50/60*     (2019.01)
    *B60L 50/71*     (2019.01)
    *H02P 27/06*     (2006.01)
    *H02J 1/10*     (2006.01)
    *H02J 1/00*     (2006.01)

(56) References Cited

U.S. PATENT DOCUMENTS

2015/0246621 A1* 9/2015 Katano ................... B60L 50/71
                                                                         180/65.31
2015/0380788 A1   12/2015 Kazuno

FOREIGN PATENT DOCUMENTS

| JP | 2000-095043 | 4/2000 |
| --- | --- | --- |
| JP | 2001-187550 | 7/2001 |
| JP | 2003-237499 | 8/2003 |
| JP | 2009-254169 | 10/2009 |
| JP | 2013-255379 | 12/2013 |
| JP | 2014-113910 | 6/2014 |
| JP | 2015-19448 | 1/2015 |
| JP | 2016-027541 | 2/2016 |

* cited by examiner

# ELECTRIC INTERCONNECT STRUCTURE FOR FUEL CELL VEHICLES

CROSS REFERENCE TO RELATED APPLICATIONS

This application claims priority to Japanese Patent Application No. 2016-81717 filed on Apr. 15, 2016, the entire contents of which are incorporated by reference herein.

BACKGROUND

Field

The present disclosure relates to an electric interconnect structure for fuel cell vehicles.

Related Art

JP2015-019448A discloses a fuel cell system in which a fuel cell converter and a secondary battery converter, both being DC-DC converters, are electrically connected to each other via a conductor or wire harness.

In a fuel cell vehicle, it is assumed that the fuel cell converter and the secondary battery converter are provided apart from each other when mounted on vehicle. In this case, a capacitor included in the fuel cell converter and a capacitor included in the secondary battery converter are connected to each other via wire harness. For this application, the wire harness is designed to have a proper length to avoid LC resonance. The present inventor has found that in design and manufacture of two types of fuel cell vehicles, i.e. those of left-hand drive specifications and right-hand drive specifications, they are likely to be different in the length of the wire harness for avoidance of the LC resonance depending on the position of the secondary battery converter, thereby posing a problem of complicated design and manufacture. Such problems would arise not only in the case of a fuel cell converter and a secondary battery converter but also in cases where capacitors of two DC-DC converters are connected to each other via wire harness.

SUMMARY

The present disclosure, having been accomplished to solve at least part of the above-described problems, can be implemented in the following aspects.

(1) According to an aspect of the present disclosure, there is provided an electric interconnect structure for a fuel cell vehicle. In the fuel cell vehicle, a first converter and a second converter, each being a DC-DC converter, are placed in a front compartment of the fuel cell vehicle, and in which a first capacitor included in the first converter and a second capacitor included in the second converter are electrically connected to each other via wire harness. The first converter is integrated with a fuel cell stack. A left-hand side and a right-hand side are defined in a state where a forward moving direction of the fuel cell, vehicle is viewed from an interior of the fuel cell vehicle. A connector of the first converter for connection with the wire harness is placed on either one of the right-hand side and the left-hand side of the first converter. The fuel cell vehicle has both left-hand drive specifications and right-hand drive specifications. The first converter is placed at a same position whichever of the left-hand drive specifications or the right-hand drive specifications are applied, while the second converter is placed on a selected one of the left-hand side and the right-hand side of the center line of the fuel cell vehicle for the left-hand drive specifications, while, for the right-hand drive specifications, placed on the other side of the center line of the fuel cell vehicle opposite to the selected one side for the left-hand drive specifications. A first wire harness to be used as the wire harness for the left-hand drive specifications and a second wire harness to be used as the wire harness for the right-hand drive specifications are equal in length to each other.

According to the electric interconnect structure in this aspect, since the first wire harness of the left-hand drive specifications and the second wire harness of the right-hand drive specifications are equal in length to each other, LC-resonance characteristics will be maintained at an equal level so that the design and manufacture can be simplified.

(2) In the above aspect, a connector of the first wire harness for connection with the first converter may have a same structure with a connector of the second wire harness for connection with the first converter, and a connector of the first wire harness for connection with the second converter may have a same structure with a connector of the second wire harness for connection with the second converter.

According to the electric interconnect structure in this aspect, the design and manufacture of the wire harness will be even further simplified.

(3) In the above aspect, the connector of the first converter for connection with the wire harness may be provided on the left-hand side of the first converter. In this case, the first wire harness may be fixed to a dash panel part of the fuel cell vehicle using at least part of M1 pieces of clamps set on the dash panel part for fixation of the first wire harness, where M1 is an integer of at least 3, wherein: the M1 pieces of clamps include a first clamp which the first wire harness connected to the connector of the first converter first reaches among the M1 pieces of clamps; the first wire harness may be laid down to pass along a rightward route through M1 pieces of clamps including the first clamp up to an N1-th clamp successively out of the M1 pieces of clamps where N1 is an integer within a range of 2 to (M1−1), thereafter passing through one or more pieces of clamps provided on the right-hand side of the N1-th clamp out of the M1 pieces of clamps so as to be fixed by those respective clamps, and going on toward the second converter. The second wire harness may be fixed to the dash panel part of the fuel cell vehicle using at least part of M2 pieces of clamps set on the dash panel part for fixation of the second wire harness, where M2 is an integer of at least 3, wherein: the M2 pieces of clamps include a first clamp which the second wire harness connected to the connector of the first converter first reaches among the M2 pieces of clamps; the second wire harness is laid down to pass along a rightward route through N2 pieces of clamps including the first clamp up to an N2-th clamp successively where N2 is art integer within a range of 2 to (M2−1), and thereafter is reversed so as to form a bent portion, then passing through one or more pieces of clamps provided on the left-hand side of the first clamp out of the M2 pieces of clamps so as to be fixed by those respective clamps, and going on toward the second converter; and the N2-th clamp is provided at a position immediately preceding the bent portion of the second wire harness.

According to the electric interconnect structure for a fuel cell vehicle in this aspect, since the N-th clamp is placed at a position immediately preceding the bent portion of the second wire harness, tension applied to the second wire harness will be set generally equal in level to that of the first wire harness, so that the distance between the positive conductor and the negative conductor will be maintained equal between the individual wire harness units. As a consequence, the electrical connection state in the first wire harness and the second wire harness will be stabilized, and moreover the design and manufacture of the wire harness will be simplified.

(4) Alternatively, the connector of the first converter for connection with the wire harness may be provided on the right-hand side of the first converter. In this ease, the first wire harness may be fixed to a dash panel part of the fuel cell vehicle using at least part of M1 pieces of clamps set on the dash panel part for fixation of the first wire harness, where M1 is an integer of at least 3, wherein: the M1 pieces of clamps include a first clamp which the first wire harness connected to the connector of the first converter first reaches among the M1 pieces of clamps; the first, wire harness may be laid down to pass along a leftward route through N1 pieces of clamps including the first clamp up to an N1-th clamp successively out of the M1 pieces of clamps where N1 is an integer within a range of 2 to (M1−1), and thereafter is reversed so as to form a bent portion, then passing through one or more pieces of clamps provided on the right-hand side of the first clamp out of the M1 pieces of clamps so as to be fixed by those respective clamps, and going on toward the second converter; and the N1-th clamp is provided at a position immediately preceding the bent portion of the first wire harness. The second wire harness may be fixed to the dash panel part of the fuel cell vehicle using at least part of M2 pieces of clamps set on the dash panel, part for fixation of the second wire harness, where M2 is an integer of at least 3, wherein: the M2 pieces of clamps include a first clamp which the second wire harness connected to the connector of the first converter first reaches among the M2 pieces of clamps; and the second wire harness may laid down to pass along a leftward route through N2 pieces of clamps including the first, clamp up to an N2-th clamp successively where N2 is an integer within a range of 2 to (M2−1), thereafter passing through one or more pieces of clamps provided on the left-hand side of the N2-th clamp out of the M2 pieces of clamps so as to be fixed by those respective clamps, and going on toward the second converter.

According to the electric interconnect structure in this aspect, since the N-th clamp is placed at a position immediately preceding the bent portion of the first wire harness, tension applied to the second wire harness will be set generally equal in level to that of the first wire harness, so that the distance between the positive conductor and the negative conductor will be maintained equal between the individual wire harness units. As a consequence, the electrical connection state in the first wire harness and the second wire harness will be stabilized, and moreover the design and manufacture of the wire harness can be simplified.

The present disclosure may also be implemented in various modes other than the above-described aspects. For example, the present disclosure may be implemented in modes such as a fuel cell vehicle, or a manufacturing method for fuel cell vehicles.

DESCRIPTION OF THE EMBODIMENTS

Figure 1:
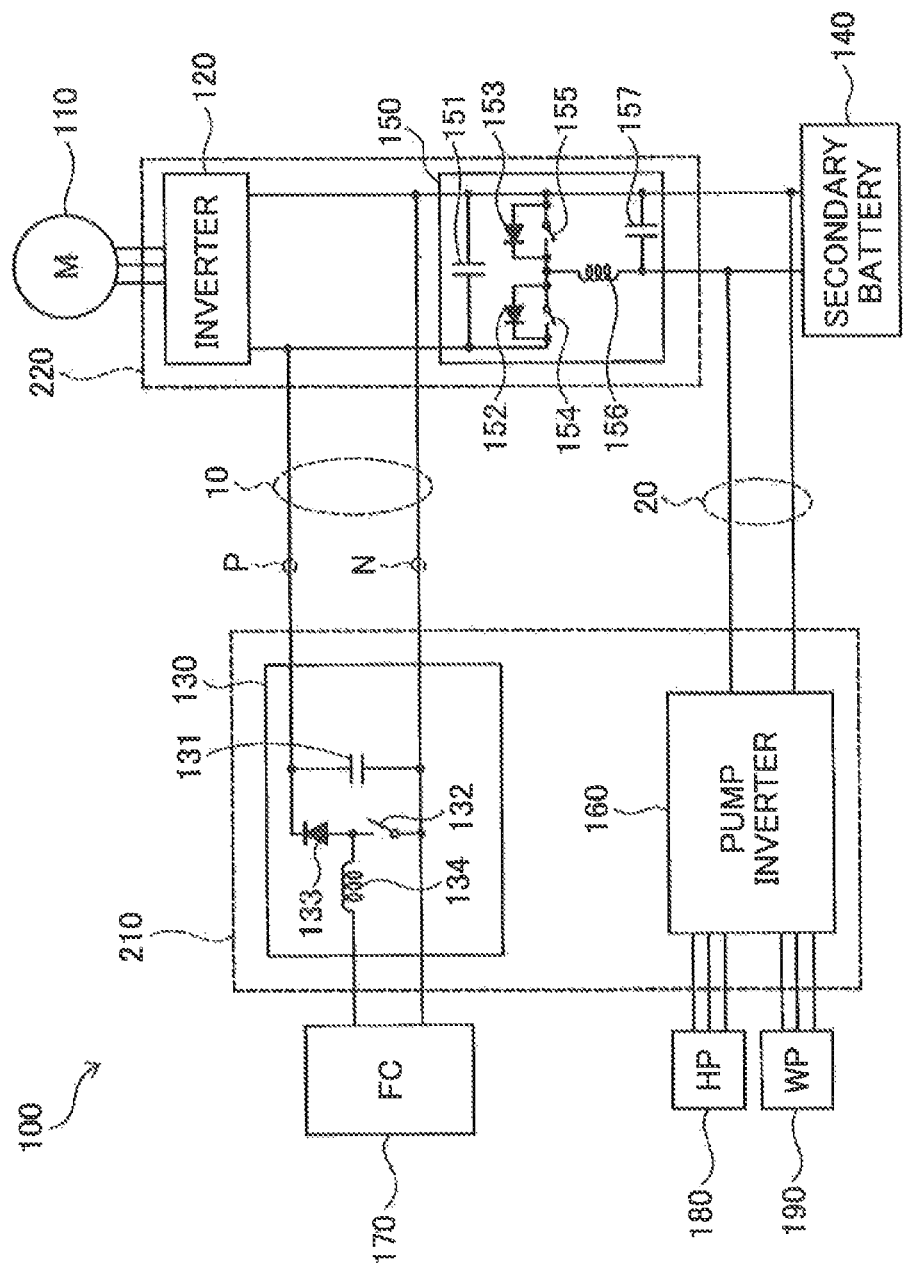
FIG. 1 is a diagram of an electrical configuration of a fuel cell system in one embodiment of the present, disclosure.

FIG. 1 is a diagram showing an electrical configuration of a fuel cell system 100 in one embodiment of the present disclosure. The fuel cell system 100 is mounted on a fuel cell vehicle. The fuel cell system 100 includes a fuel cell stack 170, an FC converter 130 (first converter), a secondary battery 140, a battery converter 150 (second converter), a motor inverter 120, a drive motor 110, a pump inverter 160, a hydrogen pump 180, and a water pump 190. The FC converter 130 and the battery converter 150 are each a DC-DC converter. The FC converter 130 and the pump inverter 160 are integrated to constitute an FC power control unit (FCPC) 210, The battery converter 150 and the motor inverter 120 are integrated to constitute a power control unit (PCU) 220.

The fuel cell stack 170 is, for example, a solid polymer type fuel cell which generates electric power with a fuel gas and an oxidizing gas supplied as reactant gases. As the fuel cell stack 170, other various types of fuel cells may be adopted without limitation to the solid polymer type fuel cell. The fuel cell stack 170 is electrically connected to the FC converter 130.

The FC converter 130 is a DC-DC converter for boosting an output voltage of the fuel cell stack 170 to a high voltage appropriate for drive of the drive motor 110. The FC converter 130 is provided with a reactor coil 134, a diode 133, a switch 132, and a smoothing capacitor 131 (first capacitor). Boosting-side terminals of the FC converter 130 are connected to the motor inverter 120 via wire harness 10. It is noted that the wire harness 10 is DC conductors including a positive conductor P and a negative conductor N. The wire harness 10 may be one which allows a current of e.g. 100 amperes or more to flow therethrough steadily.

The secondary battery 140 is, for example, a lithium ion battery, which is charged with electric power derived from the fuel cell stack 170, and which functions as a power source for driving the drive motor 110, the hydrogen pump 180, and the water pump 190. The secondary battery 140 is electrically connected to the battery converter 150. The secondary battery 140 is also connected to the pump inverter 160 via wire harness 20. The pump inverter 160 converts a DC voltage derived from the secondary battery 140 to an AC voltage and supplies the AC voltage to the hydrogen pump 180 and the water pump 190 to drive these pumps.

The battery converter 150 is a bidirectional DC-DC converter for stepping down an output voltage of the fuel cell stack 170 and supplies the resultant voltage to the secondary battery 140, or for stepping up an output voltage of the secondary battery 140 and supplying the resultant voltage to the motor inverter 120. The battery converter 150 also controls charging and discharging of the secondary battery 140. More specifically, when an output power of the fuel cell stack 170 is insufficient for a target output power of the fuel cell vehicle, the battery converter 150 causes the secondary battery 140 to discharge. Meanwhile, when regenerative power is generated in the drive motor 110, the battery converter 150 causes the secondary battery 140 to accumulate the regenerative power. The battery converter 150 is provided with a smoothing capacitor 157 for use of voltage step-down, a reactor coil 156, switches 154, 155, diodes 152, 153, and a smoothing capacitor 151 (second capacitor) for use of voltage step-up. High-voltage side terminals of the battery converter 150 are electrically connected to the motor inverter 120.

The drive motor 110 is a motive power source for driving wheels of the fuel cell vehicle and exemplified by a three-phase AC motor. The drive motor 110 is electrically connected to the motor inverter 120. The motor inverter 120 converts DC power supplied from the fuel cell stack 170 or the secondary battery 140 to three-phase AC power and supplies the AC power to the drive motor 110. The motor inverter 120 also converts a regenerative power generated in the drive motor 110 to a DC power and delivers the DC power to the battery converter 150.

The smoothing capacitor 131 included in the FC converter 130 and the smoothing capacitor 151 included in the battery converter 150 are electrically connected to each other via the wire harness 10. Since the wire harness 10 can have a current of 100 amperes or more flowing therethrough steadily, the length of the wire harness 10 is appropriately designed for efficient electric power transmission in an LC resonance-free condition. In a case where two types of fuel cell vehicles, left-hand drive specified vehicles and right-hand drive specified vehicles, are manufactured, differences in the length of the wire harness 10 between the two types could cause LC resonance. There is a countermeasure for avoiding LC resonance by additionally setting a coil for the wire harness 10 to adjust the L component, but this would lead to complicated design and manufacture. Accordingly, there has been devised in this embodiment, an electric interconnect structure capable of being compatible with both left- and right-hand drive specified fuel cell vehicles, without changing the length of the wire harness 10.

Figure 2:
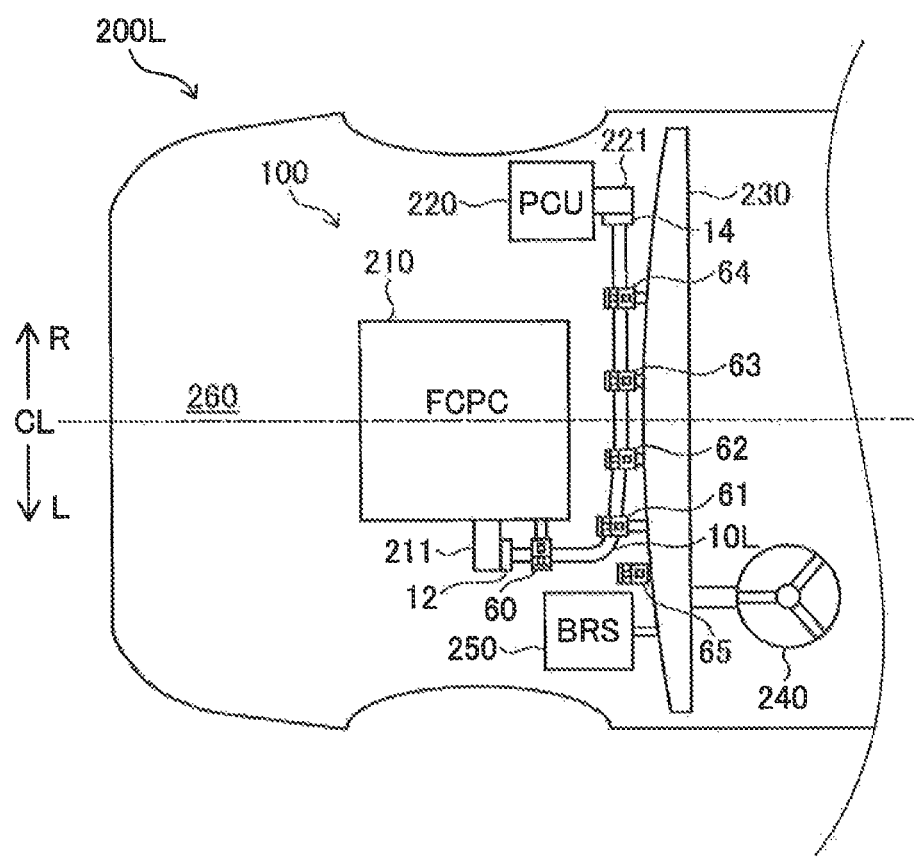
FIG. 2 is a simplified diagram of an electric interconnect structure of a left-hand drive specified fuel cell vehicle in one embodiment of the disclosure.

FIG. 2 is a simplified diagram of an electric interconnect structure of a left-hand drive specified fuel cell vehicle 200L. A center line CL is a center axis (a center axis extending along the vehicle's forward moving direction) passing through a left-right widthwise center of the fuel cell vehicle 200L. FIG. 2 also shows a direction L toward a left-hand, side of the vehicle and a direction R toward a right-hand side of the vehicle. Herein, the term 'right-hand side' or 'rightward direction' is defined in the state where the vehicle's forward moving direction is viewed from the interior of the fuel cell vehicle 200L. The term 'left-hand side' or 'leftward direction' refers to the reversal of the 'right-hand side' or 'rightward direction.'

A front compartment 260 is provided outside a dash panel part 230 of the fuel cell vehicle 200L. A fuel cell system 100 and a brake system 250 are placed inside the front compartment 260. A plurality of clamps 61 to 65 for the wire harness 10 (FIG. 1) are provided on the dash panel part 230. A steering wheel 240 is placed on the left-hand half of the fuel cell vehicle 200L, and the brake system 250 is provided at a position close to the steering wheel 240. It is noted that FIG. 2 depicts only the FCPC 210, the PCU 220 and first wire harness 10L out of the fuel cell system 100 for convenience of illustration. The first wire harness 10L is used as the wire harness 10 (FIG. 1) in the fuel cell vehicle 200L. The term 'dash panel part 230' is herein used as a term inclusive of a cowl panel and a narrow-sense dash panel.

The FCPC 210 of the fuel cell system 100 is positioned on the center line CL of the fuel cell vehicle 200L, and its connector 211 for connection with the first wire harness 10L is provided on the left-hand side of the FCPC 210 with reference to the center line CL. This connector 211 corresponds to a connector of the FC converter 130 with the wire harness 10 in FIG. 1. A connector 12 provided at one end of the first wire harness 10L is connected to the connector 211 of the FCPC 210, while a connector 14 of the other end is connected to a connector 221 of the PCU 220. This connector 221 corresponds to a connector of the battery converter 150 with the wire harness 10 in FIG. 1. The first wire harness 10L is fixed to the dash panel part 230 by the clamps 61 to 64 out of the plurality of clamps 61 to 65 set on the dash panel part 230. In addition, for securement of a stable connection between the end portion of the first wire harness 10L and the connector 211 of the FCPC 210, it is preferable that a vicinity of the end portion of the first wire harness 10L be fixed to the FCPC 210 by a clamp 60 set on the FCPC 210. The PCU 220 is preferably placed on the right-hand half of the fuel cell vehicle 200L so as to prevent positional interference with the brake system 250. The clamp 65, which is out of use in FIG. 2, may be omitted. The clamps 61 to 64 in use may be increased or decreased in number arbitrarily.

Figure 3:
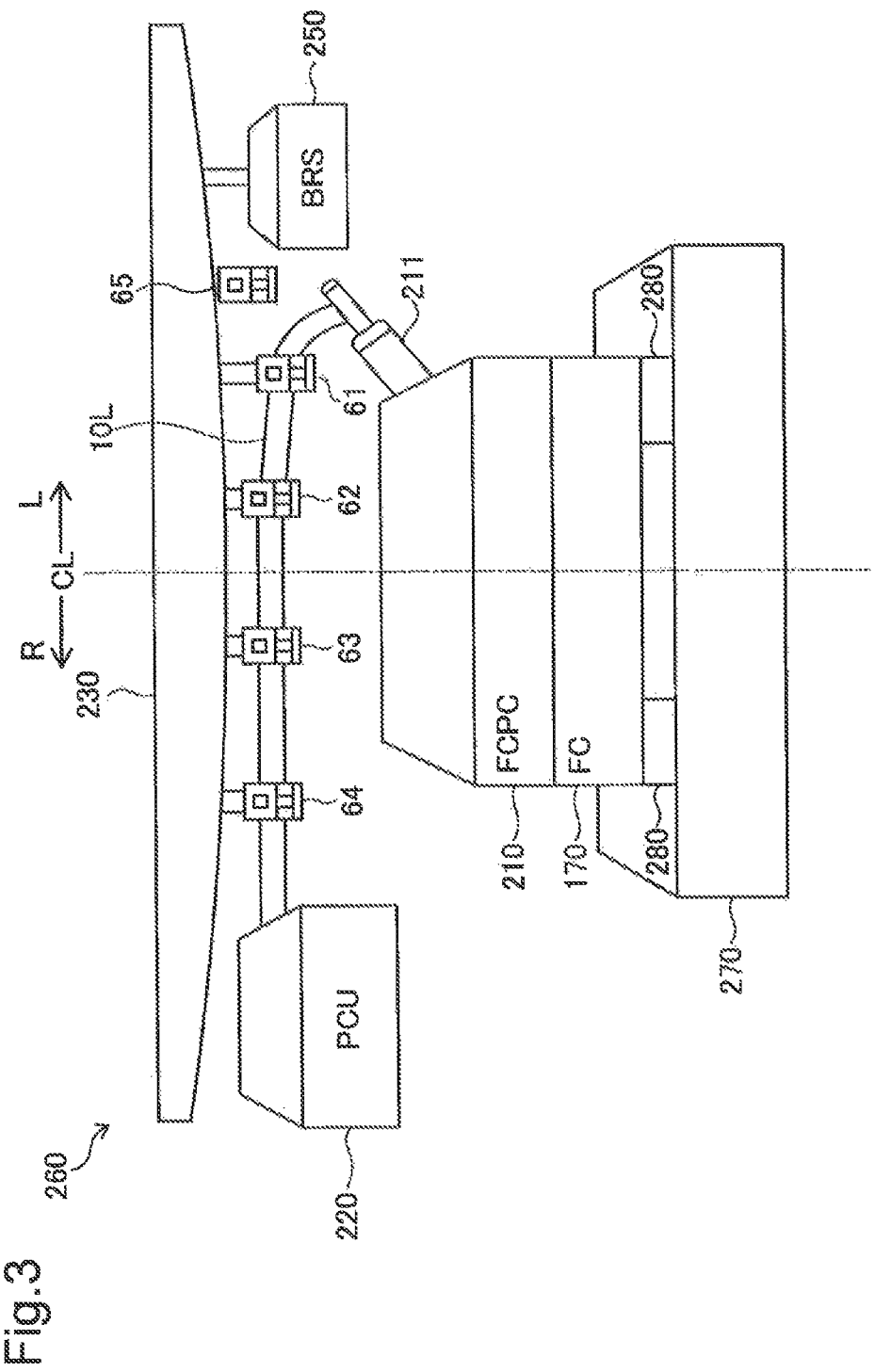
FIG. 3 is a view of a front compartment interior of the left-hand drive specified fuel cell vehicle as it is viewed from the front.

FIG. 3 is a view of the interior of a front compartment 260 of the left-hand drive specified fuel cell vehicle 200L as it is viewed from the vehicle's front end. The FCPC 210 is integrated with the fuel cell stack 170 and mounted on a rubber mount 280 provided on a suspension member 270. The first wire harness 10L is connected to the connector 211 of the FCPC 210, passing through the clamp 60 (FIG. 2) on the FCPC 210 and thereafter following a route described below until it reaches the connector 221 (FIG. 2) of the PCU 220. That is, the first wire harness 10L first reaches and passes through the clamp 61 (first clamp) set on the dash panel part 230, then passing through the clamp 62 (second clamp) set on the further right-hand side and thereafter passing through the other clamps 63, 64 provided on the right-hand side of the clamp 62. Thus, the first wire harness 10L passes along a rightward route through the clamps 61 to 62 to 63 to 64 successively, being fixed by the respective clamps and finally fixed to the connector 221 (FIG. 2) of the PCU 220. The clamp 61 which the first wire harness 10L first reaches, among the plurality of clamps 61 to 65 provided on the dash panel part 230, is preferably the clamp that is the closest to the connector 211 of the FCPC 210 among those clamps 61 to 65.

Figure 4:
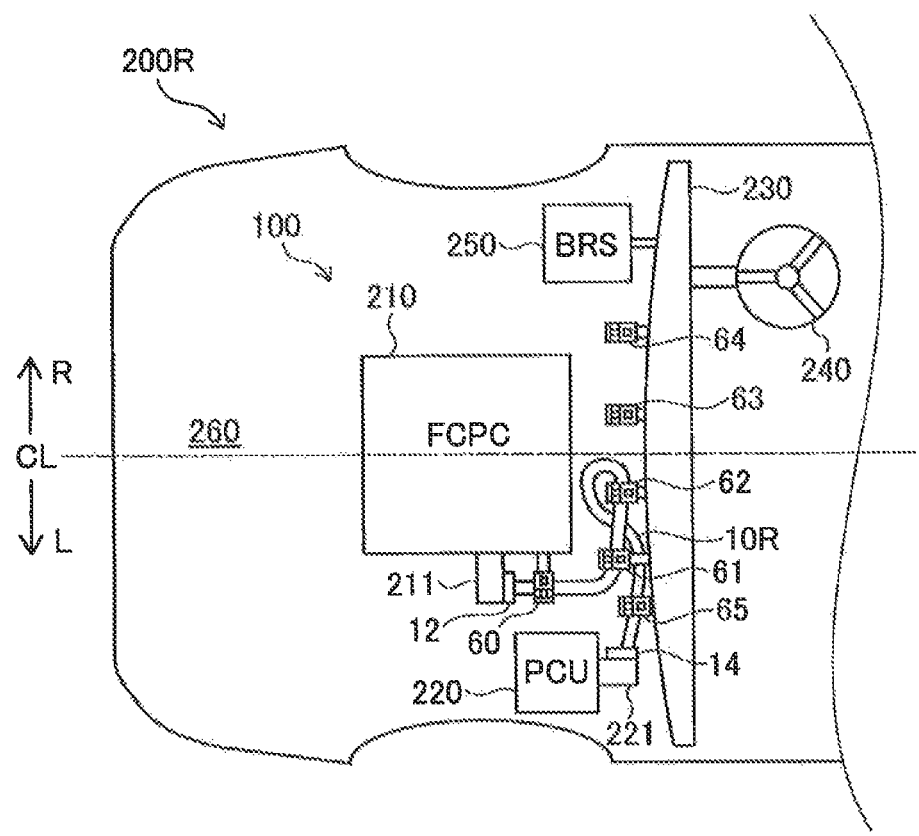
FIG. 4 is a simplified diagram of an electric interconnect structure of a right-hand drive specified fuel cell vehicle.

FIG. 4 is a simplified diagram of an electric interconnect structure of a right-hand drive specified fuel cell vehicle 200R. Its difference from the left-hand drive specified vehicle shown in FIG. 2 lies only in placement of the PCU 220, the brake system 250, the steering wheel 240 and second wire harness 10R, while the rest of the components being similar to those of the left-hand drive specified vehicle. With the right-hand drive specifications, the PCU 220 is placed on the left-hand half of the fuel cell vehicle 200R while the brake system 250 and the steering wheel 240 are placed on the right-hand half of the fuel cell vehicle 200R. Preferably, the PCU 220, the brake system 250 and the steering wheel 240 of the right-hand drive specifications are placed at mirror-symmetrical positions with reference to the line CL with those of the left-hand drive specifications. The FCPC 210 is placed at the same position whichever of the left-hand drive specifications or the right-hand drive specifications are applied.

The second wire harness 10R is used as the wire harness 10 (FIG. 1) in the fuel cell vehicle 200R. The second wire harness 10R is equal in length to the first wire harness 10L (FIG. 2) of the left-hand drive specifications. The connector 12 of the second wire harness 10R for connection with the FCPC 210 may be same or identical in structure with the connector 12 of the first wire harness 10L for connection with the FCPC 210, and the connector 14 of the second wire harness 10R for connection with the PCU 220 may be same or identical in structure with the connector 14 of the first wire harness 10L for connection with the PCU 220. Also, the second wire harness 10R may be the same product as the first wire harness 10L. Herein, the term 'equal in length' does not need be strictly equal in length, and 'equal in length' is allowed in reference to differences of 3 cm or less between lengths of the two members. This is because differences of such a degree have little effect on the LC resonance. In other words, the term 'equal in length' refers to lengths that can be evaluated as equal in length to each other from the viewpoint of the LC resonance characteristic. The second wire harness 10R is fixed to the dash panel part 230 by the clamps 61, 62, 65 out of the plurality of clamps 61 to 65 set on the dash panel part 230. The clamps 63, 64 out of use in FIG. 4 may be omitted. The clamps 61, 62, 65 in use may be increased or decreased in number arbitrarily.

Figure 5:
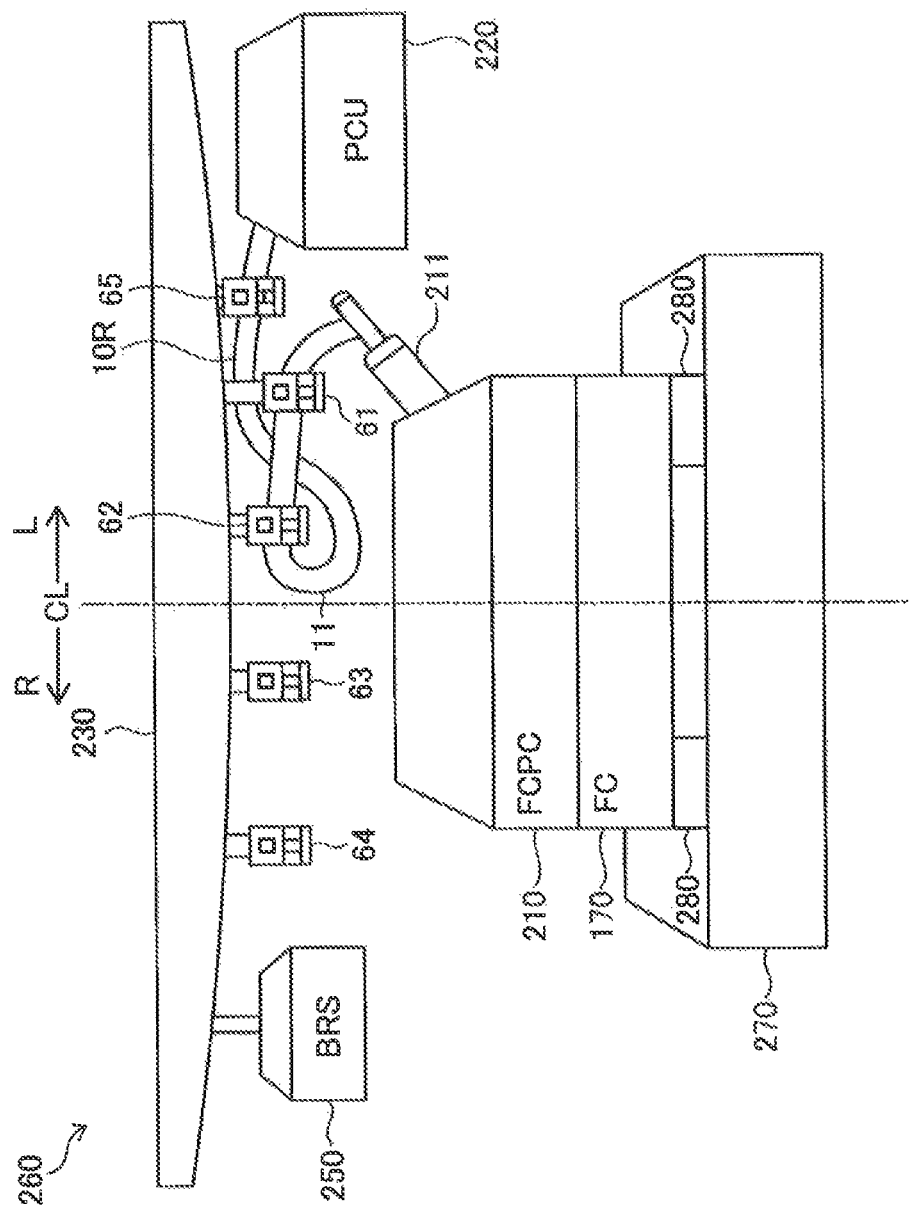
FIG. 5 is a view of a front compartment interior of the right-hand drive specified fuel cell vehicle as it is viewed from the front.

FIG. 5 is a view of the interior of a front compartment 260 of the right-hand drive specified fuel cell vehicle 200R as it is viewed from the vehicle's front end. As in the first wire harness 10L (FIG. 3), the second wire harness 10R is connected to the connector 211 of the FCPC 210, passing through the clamp 60 (FIG. 2) on the FCPC 210. Thereafter, the second wire harness 10R first reaches and passes through the first clamp 61 set on the dash panel part 230, then passing through the second clamp 62 placed on the further right-hand side. However, after passing through the clamps 61, 62 successively, the second wire harness 10R is reversed to form a bent portion 11, going on leftward and passing through the clamp 65 placed on the left-hand side of the clamp 61 while being fixed by those respective clamps, and finally fixed to the connector 221 (FIG. 4) of the PCU 220. It is noted that the clamp 62 is placed at a position immediately preceding the bent portion 11 of the second wire harness 10R. Herein, the term 'position immediately preceding the bent portion 11' refers to a position distanced within 2 cm measuring from an bend start point where the bending of the bent portion 11 starts. Its effects will be described later.

Figure 6:
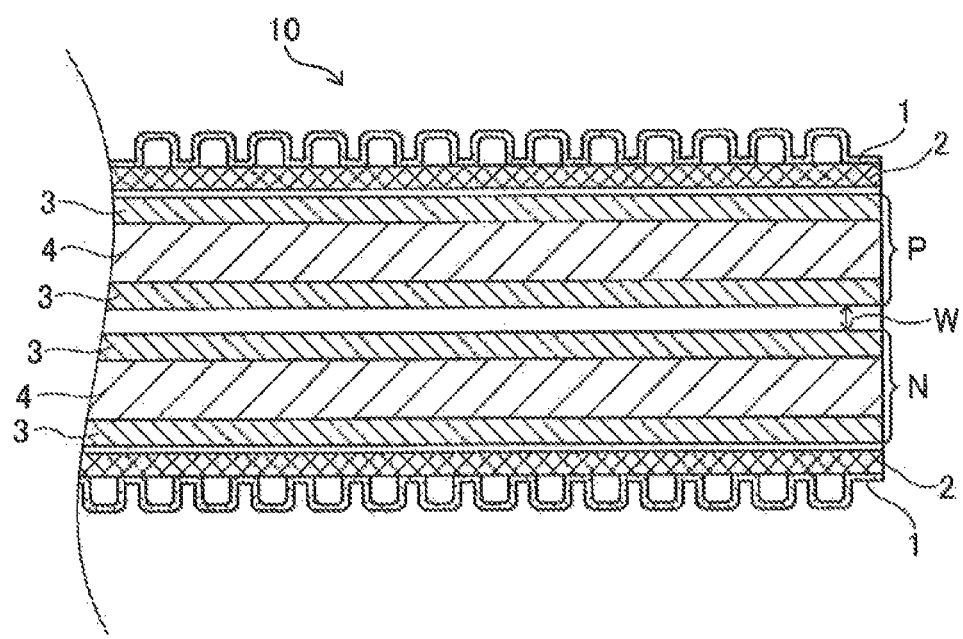
FIG. 6 is a sectional view of an example of the wire harness.

FIG. 6 is a sectional view of an example of the wire harness 10. The wire harness 10 is structured such that a periphery of a positive conductor P and a negative conductor N is sheathed with a shielding wire 2, and moreover a surface of the shielding wire 2 is sheathed with a corrugate tube 1. The positive conductor P and the negative conductor N are each formed from a metal conductor 4 covered with a protective layer 3. A gap W is provided between the positive conductor P and the negative conductor N. By virtue of adopting a structure in which the clamp 62 is placed at a position immediately preceding the bent portion 11 in the second wire harness 10R (FIG. 5), tension applied to the second wire harness 10R (in particular, tension on the bent portion 11) can be made similar in level to tension applied to the first wire harness 10L, allowing the distance of the gap W in the bent portion 11 to be maintained generally equal to the distance of the gap W in the first wire harness 10L. Thus, too much variations in the distance between the positive conductor P and the negative conductor N in the second wire harness 10R can be suppressed. As a result of this, an LC component of the second wire harness 10R having the bent portion 11 and an LC component of the first wire harness 10R (FIG. 3) having no bent portion 11 can be maintained generally equal in level to each other, so that the first wire harness 10L and the second wire harness 10R can be stabilized in terms of their electrical connected state.

As described hereinabove, in this embodiment, with regard to the fuel cell vehicles 200L, 200R, since the first wire harness 10L of the left-hand drive specifications and the second wire harness 10R of the right-hand drive specifications are equal in length to each other, their design and manufacture can be simplified. Moreover, since the clamp 62 is placed at a position immediately preceding the bent portion 11 of the second wire harness, the LC component of the first wire harness 10L and the LC component of the second wire harness 10R can be maintained generally equal in level to each other, so that design and manufacture of the wire harness can be simplified. Note that, in the fuel cell vehicles 200L, 200R, part or entirety of the plurality of clamps 61 to 65 may be omitted.

Modification 1

The foregoing embodiment has been described on a case in which the smoothing capacitors 131, 151 of the FC converter 130 and the battery converter 150 are connected to each other via the wire harness 10. However, the disclosure of the present application is, in general, applicable to cases in which capacitors of two DC-DC converters mounted on a fuel cell vehicle are connected to each other via wire harness.

Modification 2

The number of clamps provided on the dash panel part 230 for fixation of the first wire harness 10L may be set generally to M1 where M1 is an integer of 3 or more. In this case also, the first clamp 61 described in FIGS. 2 and 3 is the clamp which the first wire harness 10L connected to the connector 211 of the FCPC 210 (first converter) first reaches among the M1 pieces of clamps. Then, the first wire harness 10L of the left-hand drive specifications is laid down to pass along a rightward route through N1 pieces of clamps including the first clamp 61 up to the N1-th clamp out of the M1 pieces of clamps successively, where N1 is an integer within a range of 2 to (M−1), thereafter passing through one or more pieces of clamps provided on the right-hand side of the N1-th clamp so as to be fixed by those respective clamps, and going on toward the PCU 220 (second converter). In the example of FIGS. 2 and 3, M1=5 and N1=2. With such an electric interconnect structure, the first wire harness 10L can be fixed securely by the M1 pieces of clamps. If the clamps 64, 65 are omitted in FIGS. 2 and 3, such an example follows that M1=3 and N1=2. Also, if the clamp 65 alone is omitted in FIGS. 2 and 3, it follows that M1=4 and N1=2.

The number of clamps provided on the dash panel part 230 for fixation of the second wire harness 10R may be set generally to M2 where M2 is an integer of 3 or more. In this case also, the first clamp 61 described in FIGS. 4 and 5 is the clamp which the second wire harness 10R connected to the connector 211 of the FCPC 210 (first converter) first reaches among the M2 pieces of clamps. Then, the second wire harness 10R of the right-hand drive specifications is laid down to pass along a rightward route through N2 pieces of clamps including the first clamp 61 up to the N2-th clamp out of the M2 pieces of clamps successively, where N2 is an integer within a range of 2 to (M2−1), and thereafter is reversed so as to form the bent portion 11, passing through one or more pieces of clamps provided on the left-hand side of the first clamp 61 so as to be fixed by those respective clamps, and going on toward the PCU 220 (second converter). In the example of FIGS. 4 and 5, M2=5 and N2=2. With such an electric interconnect structure, the second wire harness 10R can be fixed securely by the M2 pieces of clamps, and moreover the first wire harness 10L of the left-hand drive specifications and the second wire harness 10R of the right-hand drive specifications can be made equal in length to each other. If the clamps 63, 64 omitted in FIGS. 4 and 5, such an example follows that M2=3 and N2=2. The number M1 of clamps for the first wire harness 10L and the number M2 of clamps for the second wire harness 10R may be either equal to each other or different from each other. However, given that M1=M2 and that M1 (=M2) pieces of clamps are provided at unchanging or same positions whichever of the left-hand drive specifications or the right-hand drive specifications are applied, the design and structure of the wire harness and the dash panel part can be even further simplified.

Modification 3

The foregoing Modification 2 has been described on an electric interconnect structure in which the connector 211 of the FCPC 210 (first converter) is provided on the left-hand side of the FCPC 210 as shown in FIG. 2. However, also in a case where the connector 211 is provided on the right-hand side of the FCPC 210, a similar electric interconnect structure may be adopted. In this case, the first wire harness 10L of the left-hand drive specifications will be laid down to pass along a leftward route through N1 pieces of clamps including the first clamp up to the N1-th clamp out of the M1 pieces of clamps successively, where N1 is an integer within a range of 2 to (M1−1) and M1 is an integer of 3 or more, and thereafter is reversed so as to form the bent portion, passing through one or more pieces of clamps provided on the right-hand side of the first clamp so as to be fixed by those respective clamps, and going on toward the PCU 220 (second converter). Also, the second wire harness 10R of the right-hand drive specifications will be laid down to pass along a leftward route through N2 pieces of clamps including the first clamp up to the N2-th clamp out of the M2 pieces of clamps successively, where N2 is an integer within a range of 2 to (M2−1) and M2 is an integer of 3 or more, thereafter passing through one or more pieces of clamps provided on the left-hand side of the N2-th clamp so as to be fixed by those respective clamps, and going on toward the PCU 220 (second converter).

The disclosure is not limited to the above-described embodiments and modifications, and may be implemented in various ways within a scope that does not depart from its gist. For example, technical features in the embodiments and modifications corresponding to technical features in the individual modes described in the section of SUMMARY may be interchanged or combined in various ways as required in order to solve part or entirety of the above-described problems or to achieve part or entirety of the above-described advantageous effects. Furthermore, component elements other than elements described in the independent claims oat of the component elements in the above-described embodiments and modifications are additional elements and therefore may be omitted as required.

What is claimed is:

1. An electric interconnect structure for a fuel cell vehicle in which a first converter and a second converter, each being a DC-DC converter, are placed in a front compartment of the fuel cell vehicle, and in which a first capacitor included in the first converter and a second capacitor included in the second converter are electrically connected to each other via wire harness, wherein the first converter is integrated with a fuel cell stack, a left-hand side and a right-hand side are defined in a state where a forward moving direction of the fuel cell vehicle is viewed from an interior of the fuel cell vehicle, a connector of the first converter for connection with the wire harness is placed on either one of the right-hand side and the left-hand side of the first converter, the fuel cell vehicle has both left-hand drive specifications and right-hand drive specifications, the first converter is placed at a same position whichever of the left-hand drive specifications or the right-hand drive specifications are applied, the second converter is placed on a selected one of the left-hand side and the right-hand side of the center line of the fuel cell vehicle for the left-hand drive specifications, while, for the right-hand drive specifications, placed on the other side of the center line of the fuel cell vehicle opposite to the selected one side for the left-hand drive specifications, and a first wire harness to be used as the wire harness for the left-hand drive specifications and a second wire harness to be used as the wire harness for the right-hand drive specifications are equal in length to each other.

2. The electric interconnect structure for a fuel cell vehicle in accordance with claim 1, wherein a connector of the first wire harness for connection with the first converter has a same structure with a connector of the second wire harness for connection with the first converter, and a connector of the first wire harness for connection with the second converter has a same structure with a connector of the second wire harness for connection with the second converter.

3. The electric interconnect structure for a fuel cell vehicle in accordance with claim 1, wherein the connector of the first converter for connection with the wire harness is provided on the left-hand side of the first converter, the first wire harness is fixed to a dash panel part of the fuel cell vehicle using at least part, of M1 pieces of clamps set on the dash panel part for fixation of the first wire harness, where M1 is an integer of at least 3, wherein the M1 pieces of clamps include a first clamp which the first wire harness connected to the connector of the first converter first reaches among the M1 pieces of clamps, the first wire harness is laid down to pass along a rightward route through N1 pieces of clamps including the first clamp up to an N1-th clamp successively out of the M1 pieces of clamps where N1 is an integer within a range of 2 to (M1−1), thereafter passing through one or more pieces of clamps provided on the right-hand side of the N1-th clamp out of the M1 pieces of clamps so as to be fixed by those respective clamps, and going on toward the second converter, the second wire harness is fixed to the dash panel part of the fuel cell vehicle using at least part of M2 pieces of clamps set on the dash panel part for fixation of the second wire harness, where M2 is an integer of at least. 3, wherein the M2 pieces of clamps include a first clamp which the second wire harness connected to the connector of the first converter first reaches among the M2 pieces of clamps, the second wire harness is laid down to pass along a rightward route through N2 pieces of clamps including the first clamp up to an N2-th clamp successively where N2 is an integer within a range of 2 to (M2−1), and thereafter is reversed so as to form a bent portion, then passing through one or more pieces of clamps provided on the left-hand side of the first clamp out of the M2 pieces of clamps so as to be fixed by those respective clamps, and going on toward the second converter, and the N2-th clamp is provided at a position immediately preceding the bent portion of the second wire harness.

4. The electric interconnect structure for a fuel cell vehicle in accordance with claim 1, wherein the connector of the first converter for connection with the wire harness is provided on the right-hand side of the first converter, the first wire harness is fixed to a dash panel part of the fuel cell vehicle using at least part of M1 pieces of clamps set on the dash panel part for fixation of the first wire harness, where M1 is an integer of at least 3, wherein the M1 pieces of clamps include a first clamp which the first wire harness connected to the connector of the first converter first reaches among the M1 pieces of clamps, the first wire harness is laid down to pass along a leftward route through N1 pieces of clamps including the first clamp up to an N1-th clamp successively out of the M1 pieces of clamps where N1 is an integer within a range of 2 to (M1−1), and thereafter is reversed so as to form a bent portion, then passing through one or more pieces of clamps provided on the right-hand side of the first clamp out of the M1 pieces of clamps so as to be fixed by those respective clamps, and going on toward the second converter, and the N1-th clamp is provided at a position immediately preceding the bent portion of the first wire harness, the second wire harness is fixed to the dash panel part of the fuel cell vehicle using at least part of M2 pieces of clamps set on the dash panel part for fixation of the second wire harness, where M2 is an integer of at least 3, wherein the M2 pieces of clamps include a first clamp which the second wire harness connected to the connector of the first converter first reaches among the M2 pieces of clamps, and the second wire harness is laid down to pass along a leftward route through N2 pieces of clamps including the first clamp up to an N2-th clamp successively where N2 is an integer within a range of 2 to (M2−1), thereafter passing through one or more pieces of clamps provided on the left-hand side of the N2-th clamp out of the M2 pieces of clamps so as to be fixed by those respective clamps, and going on toward the second converter.

* * * * *